United States Patent
Gibson (10) Patent No.: US 8,397,236 B2
(45) Date of Patent: Mar. 12, 2013

(54) CREDIT BASED PERFORMANCE MANAGMENT OF COMPUTER SYSTEMS

(75) Inventor: Gary A. Gibson, San Diego, CA (US)

(73) Assignee: VirtualMetrix, Inc., Rancho Santa Fe, CA (US)

( * ) Notice: Subject to any disclaimer, the term of this patent is extended or adjusted under 35 U.S.C. 154(b) by 1215 days.

(21) Appl. No.: 12/197,165

(22) Filed: Aug. 22, 2008

(65) Prior Publication Data

US 2009/0055829 A1 Feb. 26, 2009

Related U.S. Application Data

(60) Provisional application No. 60/966,173, filed on Aug. 24, 2007.

(51) Int. Cl.
G06F 9/46 (2006.01)
(52) U.S. Cl. ......... 718/102; 718/100; 718/103; 718/104
(58) Field of Classification Search .................. 718/100, 718/102, 103, 104
See application file for complete search history.

(56) References Cited

U.S. PATENT DOCUMENTS

| | | | |
|---|---|---|---|
| 4,980,857 A * | 12/1990 | Walter et al. ............. | 714/45 |
| 6,671,762 B1 * | 12/2003 | Soni et al. ............... | 710/267 |
| 6,845,456 B1 | 1/2005 | Menezes et al. | |
| 7,228,355 B2 * | 6/2007 | Dowling ................. | 709/230 |
| 7,228,546 B1 | 6/2007 | McCarthy et al. | |
| 7,281,145 B2 | 10/2007 | Merkin et al. | |
| 7,386,586 B1 * | 6/2008 | Headley et al. ........... | 709/202 |
| 7,539,994 B2 | 5/2009 | McAlinden et al. | |
| 2002/0184292 A1 * | 12/2002 | Lal ....................... | 709/102 |
| 2002/0188691 A1 * | 12/2002 | Ignatius et al. ........... | 709/208 |
| 2004/0073905 A1 * | 4/2004 | Emer et al. .............. | 718/101 |
| 2004/0244000 A1 * | 12/2004 | Frank et al. ............. | 718/1 |
| 2005/0240752 A1 * | 10/2005 | Yokoi et al. ............. | 712/1 |
| 2007/0074207 A1 * | 3/2007 | Bates et al. ............. | 718/1 |
| 2007/0094661 A1 * | 4/2007 | Baird et al. ............. | 718/102 |
| 2007/0110094 A1 * | 5/2007 | Tobita et al. ........... | 370/453 |
| 2009/0007114 A1 * | 1/2009 | Riddick ................. | 718/100 |

FOREIGN PATENT DOCUMENTS

| | | |
|---|---|---|
| EP | 1501013 | 1/2005 |
| JP | 07253893 | 10/1995 |
| JP | 2003131892 | 5/2003 |
| WO | 0038033 | 6/2000 |

OTHER PUBLICATIONS

Bjorn Andersson, "Static-priority scheduling on multiprocessors", 2003, department of computer engineering chalmers university of technology, pp. 1-24.*
Bensaou ( "Credit-based fair queuing (CBFQ): A simple service-scheduling Algorithm for packet-switched Networks", IEEE, 2001, pp. 591-604).*
International Search Report and Written Opinion from PCT/US08/074122 dated Feb. 27, 2009.
International Search Report and Written Opinion dated Nov. 30, 2011 for PCT/US2011/030096.

* cited by examiner

*Primary Examiner* — Meng An
*Assistant Examiner* — Caroline H Arcos
(74) *Attorney, Agent, or Firm* — Mintz, Levin, Cohn, Ferris, Glovsky and Popeo, P.C.

(57) ABSTRACT

A system and method to control the allocation of processor (or state machine) execution resources to individual tasks executing in computer systems is described. By controlling the allocation of execution resources, to all tasks, each task may be provided with throughput and response time guarantees. This control is accomplished through workload metering shaping which delays the execution of tasks that have used their workload allocation until sufficient time has passed to accumulate credit for execution (accumulate credit over time to perform their allocated work) and workload prioritization which gives preference to tasks based on configured priorities.

56 Claims, 5 Drawing Sheets

CREDIT BASED PERFORMANCE MANAGMENT OF COMPUTER SYSTEMS

FIELD OF THE INVENTION

This invention relates to systems and methods for management of the performance of tasks in a computer system.

BACKGROUND OF THE INVENTION

A computer system often runs a number of different tasks during a particular period of time. The tasks can be associated with a variety of applications. The tasks operate using a variety of computer system resources. An operating system controls and provides access to many of the computer system resources, such as the memory system. The tasks can make requests for the computer system resources to the operating system.

The tasks can perform various functions, some of which may need to be performed in real time. Functions that are performed in real time are usually associated with certain service requirements to meet real time deadlines. The service requirements are usually measured in the frequency of requests and/or response time. Thus, the real time task needs a certain minimum number of resources including execution resources to operate in real time. Other tasks may not operate in real time. Therefore, requests by these tasks can be serviced whenever the resources are available.

In practice, there are real time tasks that are measured for real time performance with an average response time over a longer time period. Additionally, the tasks may make more frequent requests during shorter periods of time.

In practice, real time tasks require a variable amount of time to process a request or event and most real time systems must budget resources, particularly execution, resources for the worst case processing time. This situation typically results in inefficient underutilized systems.

Further limitations and disadvantages of conventional and traditional approaches will become apparent to one of skill in the art, through comparison of such systems with some aspects of the present invention as set forth in the remainder of the present application with reference to the drawings.

SUMMARY

The present invention includes methods, apparatuses, and systems as described in the written description and claims. In one embodiment, a method for managing the performance of a computer system includes the steps of assigning a task profile that specifies task parameters for each of the one or more tasks. The one or more tasks are executed on a processing module of the computer system. The method also includes comparing a current real time and a computed start time associated with the one or more tasks to determine whether to select one or more tasks to be scheduled for execution on the processing module. A task to be scheduled for execution is selected when the value of the difference between the current real time and the calculated start time meets a threshold criteria. The selection can be in accordance with the task parameters including a parameter indicating that the task is not waiting on one of the occurrence and non-occurrence of an event. The scheduling of the execution of the task is delayed when the value of the difference between the current real time and the calculated start time fails to meet the threshold criteria. The method also includes prioritizing the execution schedule of the task based on the task parameters including a task priority. The execution of the task can be monitored to determine a monitored value related to the amount of work completed by the task. Further, the method includes comparing the monitored value related to the amount of work completed to a parameter value related to the amount of work to be completed by the task. A responsive action is taken when the difference between the monitored value related to the amount of work completed and the parameter value related to the amount of work to be completed meets a first threshold criteria.

In another embodiment, a system for managing the performance of a computer system is described. The system includes a management module to assign a task profile that specifies task parameters for each of the one or more tasks. The one or more tasks can be executed on a processing module of the computer system. The task profile for the one or more tasks can be stored in a storage device. The system also includes a shaper module to compare the current real time and a computed start time associated with a task of the one or more tasks to determine whether to select a task to be scheduled for execution on the processing module. The shaper module selects the task to be scheduled for execution when the value of the difference between the current real time and the calculated start time meets a threshold criteria. The selection can be in accordance with the task parameters including a parameter indicating the task is not waiting on one of the occurrence and non-occurrence of an event. In one embodiment, the shaper module delays the scheduling of the execution of the task when the value of the difference between the current real time and the calculated start time fails to meet the threshold criteria. The system further includes a scheduler module to prioritize the execution schedule of the task based on the task parameters including a task priority. A metering module monitors the execution of the task to determine a monitored value related to the amount of work completed by the task. The metering module compares the monitored value related to the amount of work completed to a parameter value related to the amount of work to be completed of the task. A responsive action can be taken when the difference between the monitored value related to the amount of work completed and the parameter value related to the amount of work to be completed meets a first threshold criteria.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description, it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
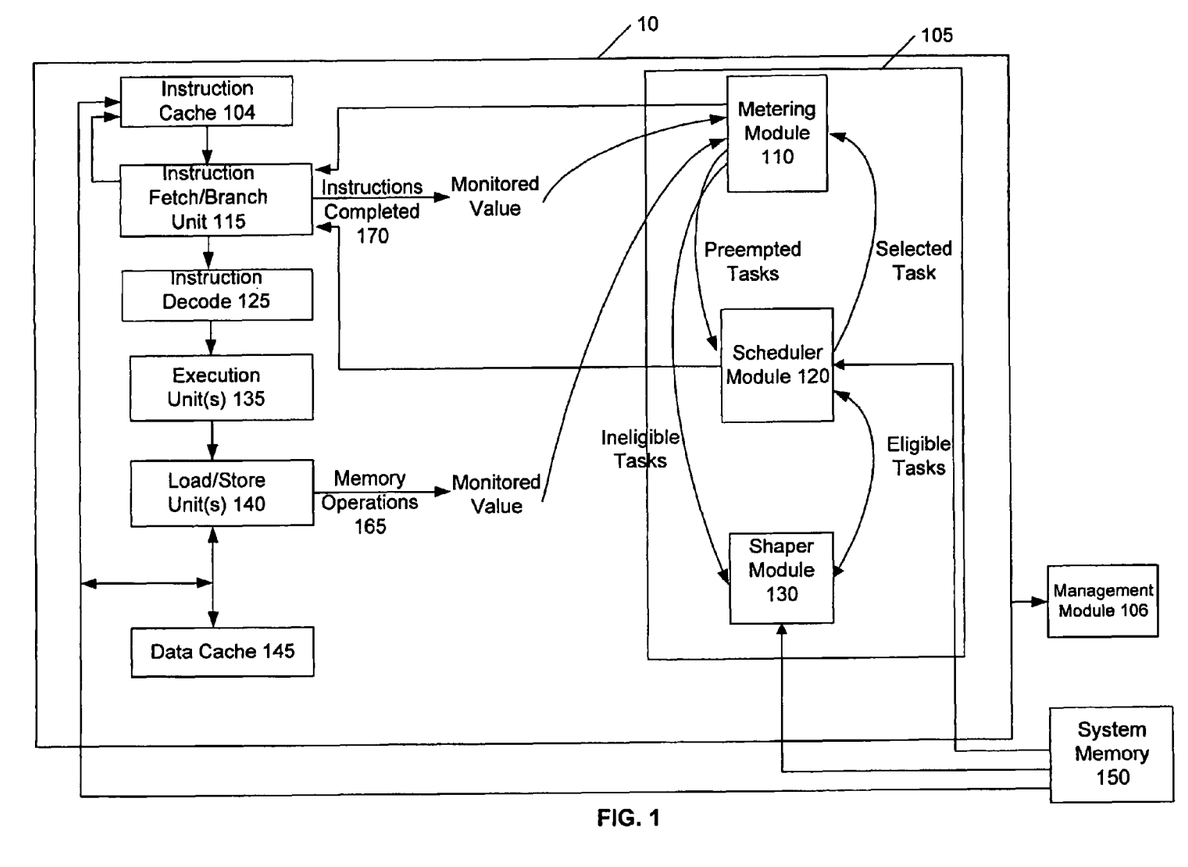
FIG. 1 is a block diagram of a computer system according to an embodiment.

FIG. 1 is a simplified block diagram of a computer system including a processor system 10, a management module 106 and a system memory 150. Some of the commonly known elements of the processor system and the computer system are not shown in the figure in order to aid understanding of the present invention. The processor system 10 can be a central processing unit, a processor, a microprocessor, a processor core or the like. The functional elements of the processor system depicted in FIG. 1 can be implemented in hardware or with a combination of hardware and software (or firmware).

One embodiment of the processor system 10 includes an instruction cache 104, instruction fetch/branch unit 115, an instruction decode module 125, an execution unit 135, a load/store unit 140, a data cache 145 and a performance management system 105 The performance management system 105 includes a metering module 110, a scheduler module 120, and a shaper module 130. In one embodiment, a task context memory, which stores the task profiles for a task, is incorporated into the system memory 150. In other embodiments, the task context memory may be independent of the system memory 150.

Throughout this document, a task may be referred to as a set of instruction to be executed by the processor system 10. A task may also be processes such as instances of computer programs that are being executed, threads of execution such as one or more simultaneously, or pseudo-simultaneously, executing instances of a computer program closely sharing resources, etc. that execute within one or more processor systems 10 (e.g., microprocessors) or virtual machines such as virtual execution environments on one or more processors. A virtual machine (VM) is a software implementation of a machine (computer) that executes programs like a real machine. In some embodiments, the tasks may be state machines such as DMA controllers and the collection of commands for such state machines (e.g., DMA channels), etc. Direct memory access is a feature of modern computers and microprocessors that allows certain hardware subsystems within the computer to access system memory for reading and/or writing independently of the central processing unit. Many hardware systems use DMA including disk drive controllers, graphics cards, network cards, sound cards and Graphics Processing Units (GPUs). DMA may also used for intra-chip data transfer in multi-core processors, especially in multiprocessor system-on-chips, where its processing element is equipped with a local memory (often called scratchpad memory) and DMA is used for transferring data between the local memory and the main memory.

The management module 106 may be part of the computer system coupled to the processing module (for example, a program residing in the system memory 150). The management module may create and assign task profiles that specify task parameters for tasks. In some embodiments, the management module 106 controls the allocation of resources by determining/controlling the task profiles (e.g. through a set of policies/rules).

The performance management system 105 of the processor system 10 controls the allocation of processor execution resources to individual tasks executing in the computer system. In some embodiments, the performance management system 105 controls the allocation of state machine execution resources to individual tasks executing in the state machine. In other embodiments the management module 106 controls the allocation of resources by determining/controlling the task profiles (e.g. through a set of policies/rules). For example, by controlling the allocation of execution resources to all tasks in the state machine, each task may be provided with throughput and response time guarantees. In one embodiment, this control is accomplished through task or workload shaping which delays the execution of tasks that have used their task or workload allocation until sufficient time has passed to accumulate credit for execution (accumulate credit over time to perform their allocated work) and task or workload prioritization which gives preference to tasks based on configured priorities.

Tasks are assigned task profiles that specify task parameters. Examples of task parameters include task priority, P, work to be completed, We, scheduling interval, Ti, and maximum work to be completed, Wm. The task priority determines the task's priority, including the task priority class such that, tasks of higher priority classes may be preferentially scheduled or queued ahead of lower priority classes. The work to be completed determines the expected work to be performed by the task when it is scheduled for execution. The maximum work to be completed specifies the maximum work the task may accumulate if, for example, the completion of its expected work is postponed. The scheduling interval is the desired time between scheduled execution runs. Thus, the expected work rate can be calculated as We/Ti, called work rate Wr.

The work may be a measure of data transference, processor instructions completed, or other meaningful units of measure of work done by the processor system 10 or state machine such as a direct memory access (DMA) controller. As this work may be measured to a fine granularity, the performance may be similarly managed to a fine granularity.

The processor system 10 executes instructions stored in the system memory 150 where many of the instruction operate on data stored in the system memory 150. The instructions may be referred to as a set of instructions or program instructions throughout this document. The system memory 150 may be physically distributed in the computer system. The instruction cache 104 temporarily stores instructions from the system memory 150. The instruction cache 104 acts as a buffer memory between system memory 150 and the processor system 10. When instructions are to be executed, they are typically retrieved from system memory copied into the instruction cache 104. If the same instruction or group of instructions is used frequently in a set of program instructions, storage of these instructions in the instruction cache 104 yields an increase in throughput because external bus accesses are eliminated.

The fetch/branch unit 115 is coupled to the instruction cache 104 and configured to retrieve instructions from the system memory 150 for storage within the instruction cache 104. The instruction decode module 125 interprets and implements the instructions retrieved. In one embodiment the decode module 125 breaks down the instructions into parts that have significance to other portions of the processor system 10. The execution unit 135 passes the decoded information as a sequence of control signals, for example, to relevant function units of the processor system 10 to perform the actions required by the instructions. The execution unit includes register files and Arithmetic Logic Unit (ALU). The actions required by the instructions can include reading values from registers, passing the values to an ALU (not shown) to add them together and writing the result to a register. The execution unit 135 may include a load/store unit 140 that is configured to perform access to the data cache 145. In other embodiments, the load/store unit 140 may be independent of the execution unit 135. The data cache 145 can be a high-speed storage device, for example a random-access memory, which contains data items that have been recently accessed from system memory 150, for example. In one embodiment, the data cache 145 can be accessed independently of the instruction cache 104.

The metering module 110 measures and monitors the work completed by a task that is currently being executed on the processor system 10. One or more tasks can be implemented on the processor system 10. In one embodiment the monitored value of work completed or information about the amount of work completed can be measured by the amount of instructions completed and can be acquired from the instruction fetch/branch unit 115 as illustrated by the arrow 170 in FIG. 1. The monitored values can also be measured by the memory operations that can be acquired from the load/store unit 140 as illustrated by the arrow 165 in FIG. 1. The meter module 110, when used to monitor memory operations (bandwidth), may be configured to only account for memory operations to/from certain addresses (such as a video frame buffer). This configuration can be varied on a task-by-task basis (with the configuration information part of the Task Context or task profile). In some implementations, there are separate metering modules 110 for instruction completion and memory operations depending on specific details of the computer system implementation. These metering modules would be similar to a single metering module 10 with data from both sources. As some processing modules 10 handle multiple threads simultaneously, the instructions completed information includes information as which thread had completed certain instructions (typically by tagging the thread or process or task identifier). The memory operations information similarly includes this thread identifier in order for the metering module 110 associate these operations to the correct task.

We will now describe one example of the processing of a task. The example task performs video decompression and is managed by the performance management system 105 by monitoring its output data rate. Video compression algorithms, used by most advanced video encoding standards, achieve high rates of data compression by exploiting the redundancy in video information. These compression algorithms remove both the temporal redundancy, arising from successive frames of video images displaying the same scene, and spatial redundancy, occurring when portions of the picture are replicated (often with minor changes) within a single frame of video. Because the decompression work load is both dependant on the content of a scene and the change in content among successive frames, the level of computation required to decompress each frame may vary significantly from one frame to another, however the resulting output data rate is, in general, constant determined by the number of pixels in the display frame, the number of bits in each pixel and the frame rate. Thus, a task performing video decompression can be managed effectively by monitoring its output data rate.

For example, a video decompression playback at 320 pixels wide×240 pixels high video display with 16 bit pixel depth at 20 frames/second, requires the video decompression task to generate 1,228,800 bits every 50 milliseconds. These values may be utilized as the expected work and the work rate in the profile for this task. Therefore, the task is scheduled to generate 1,228,800 bits of data every 50 milliseconds (so long as there is input data) regardless of the actual time required to decompress each frame (system design would require the maximum frame decompression/decode time to be less than 50 milliseconds).

The shaper module 130 has the list of ineligible tasks to be performed by the processor system 10. The shaper module determines when a task can be passed to the scheduler module 120 to be scheduled for execution. A task is eligible if the current real time (value of a real time clock) is equal to or greater than the computed start time for the task and ineligible if the start time is greater than real time. A task may be blocked if it is awaiting an event (such as arrival of a message from another task, data from an external Input-Output device, etc.) before it can be scheduled for execution and is deemed unblocked if it is not waiting for such an event. This information can be provided to the shaper by an operating system. In some embodiments, the shaper module 130 queues ineligible tasks until they become eligible, whether they are blocked or not. In other embodiments, a task is eligible for execution if it is eligible and not blocked.

The scheduler module 120 selects the next task(s) to be executed from its list of tasks based on the task parameters including task priority. The currently executing task selected by the scheduler module 120 is monitored by the metering module 110 as illustrated in FIG. 1. The scheduler module 120 may indicate that a higher priority task is ready to the processor system 10. The processor system 10 (or software on the processor system 10) may decide to preemptively switch from the currently running task and run the higher priority task. In one embodiment, the scheduler or software in the processor system indicates the that a higher priority task is available. In which case, the task currently running or executed in the processor system 10 is placed in the scheduler module 120. When this happens, the metering module 110 monitors the selected higher priority task that is now currently executing. The moving of tasks from the scheduler and shaper and as described elsewhere can be accomplished through the use of pointers or actually moving instructions between memory locations depending on design concerns.

While the metering module 110, the scheduler module 120 and the shaper module 130 can be implemented in hardware, only the metering module 110 need be for practical high performance applications. Some implementations may utilize software to implement the shaper module 130 and/or the scheduler module 120 depending on scheduling time and task workload granularity and scheduling/shaping processor overhead. Lower performance applications could implement the metering module 110, or some portion thereof, in software.

Figure 2:
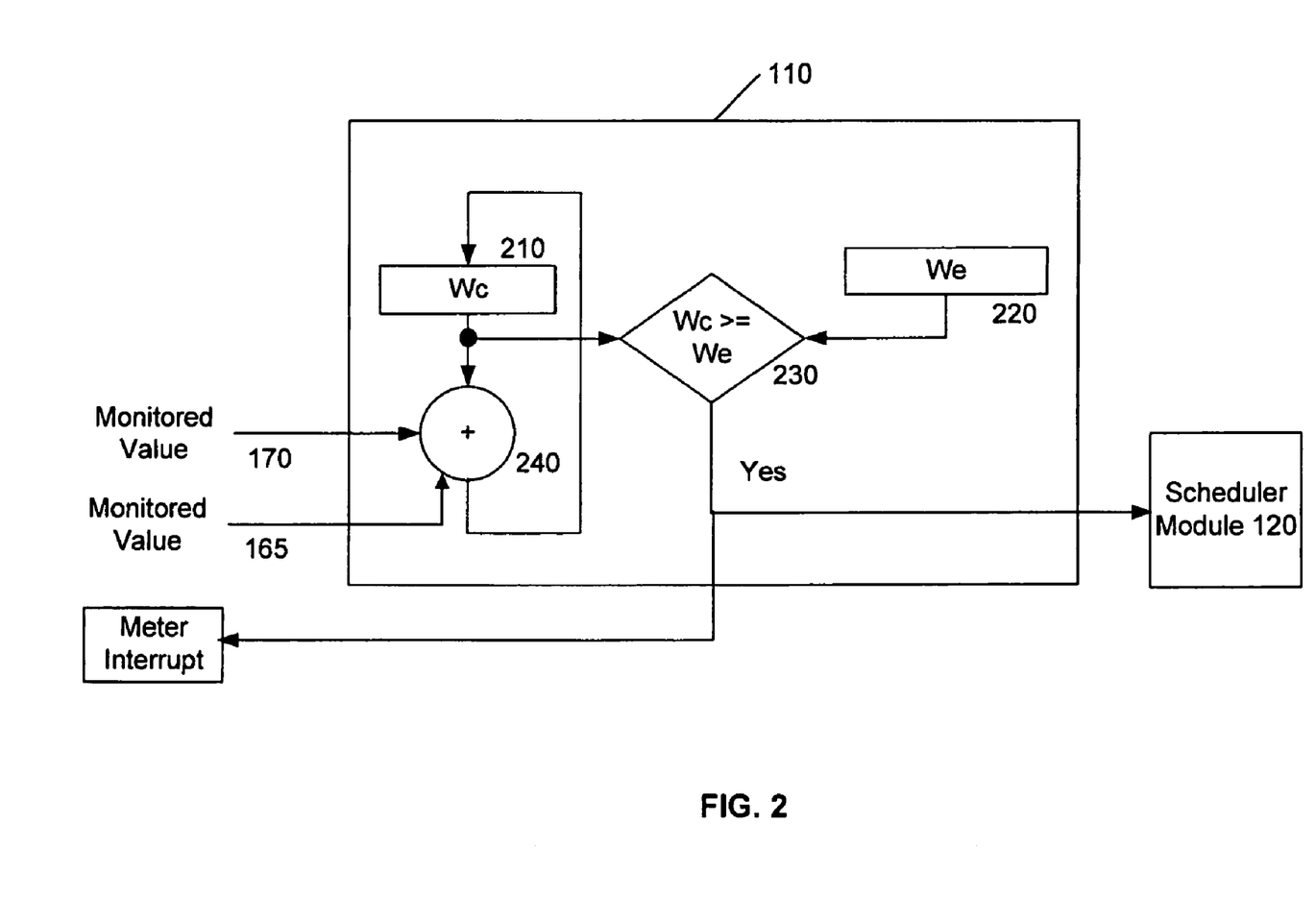
FIG. 2 is a block diagram of a metering module according to an embodiment.

FIG. 2 is a block diagram of a metering module 110 according to an embodiment. For explanatory purposes, FIG. 2 will be discussed with reference to FIG. 1. The metering module 110 measures the work performed or amount of work completed by the currently executing task(s). In one embodiment the metering module 110 monitors the execution of the task to determine a monitored value related to the amount of work completed for the task. The monitored value related to the amount of work completed can be the actual amount of work completed, a counter value or the like that is proportional to or related to the amount of work completed.

In general, one embodiment of the metering module 110 includes a work completed module 210, a work to be completed module 220, a comparator module 230, and an adder module 240. In some embodiments, the work completed module 210 is a work completed counter and the work to be completed module 220 is also a work to be completed counter. The work to be completed counter can be updated based on the work rate while the task is executing to account for the passage of time The work to be completed can calculated by the scheduler when the task is selected or moved from the scheduler to the meter, for example.

In one embodiment, a monitored value related to the work performed or work completed $W_c$ is measured by counting the accesses to memory, instructions completed, or other measurable quantities that are meaningful measurements of work by the currently executing task(s). The monitored value, for example the number of accesses to memory may be received at the adder module 240 where they are summed and provided to the work completed module 210. The monitored values can also be measured by the memory operations that can be acquired from the load/store unit 140 as illustrated by the arrow 165 in FIG. 1 above. The work to be completed module 220 receives a parameter value $W_e$ related to the amount of work to be completed. The parameter value related to the amount of work to be completed is a predetermined value that is stored in the task profile of a task. The parameter value can be the actual amount of work to be completed, a counter value or the like that is proportional to or related to the amount of work to be completed. The parameter value can also be a constant parameter or calculated from the work rate and work credit over time. In one embodiment, the parameter value is predetermined by the management module 106 during the process of mapping task to a target computer system.

The comparator module 230 receives the monitored value related to the work performed or completed $W_c$ and the monitored value related to the amount of work to be completed $W_e$. The amount of work to be completed determines the expected work to be performed by the task when it is scheduled for execution. The comparator module 230 compares the value related to the amount of work completed $W_c$ to a value related to the expected amount of work to be completed $W_e$ of the task. In one embodiment the result of the comparison is provided to the scheduler module 120 and the shaper module 130. When the completed work meets the expected work within a certain threshold criteria (e.g. when $W_c >= W_e$), an interrupt occurs and the task is put back in the shaper or the scheduler depending on the start time calculation. Either the scheduler module 120 or the metering module 110 can, for example, generate an interrupt that is read by Instruction fetch/branch unit 115 to cause the processor system 10 to move to execute a different task as selected by the scheduler module 120. The metering module 110 can interrupt when the expected work is completed (e.g. when $W_c >= W_e$), the scheduler module 120 can interrupt when a higher priority task is ready.

In general, the processor system 10 takes a responsive action when the difference between the values related to the amount of work completed and the amount of work to be completed meets a first threshold criteria. In some embodiments, the first threshold criteria occurs if Wc is greater than or equal to We as illustrated in the comparator module 230. The responsive action may be to signal the processor system 10 (or state machine) that the current task(s) has completed its scheduled work and the next selected task(s) should replace the current task(s). In some embodiments, a different responsive action may be to "throttle" the task (prevent it from completing additional work until it accumulates sufficient credit to perform additional work). This credit is accumulated at the work rate Wr times the elapsed time; thus, Cw=Cw+ (Wr*Elapsed Time). Where the elapsed time is the time since the task was last executed and the work rate Wr is the rate at which the task is performed. The accumulated credit Cw is limited to a max value Wm). The Work completion counter may have the accumulated credit subtracted from it, Wc=Wc−Cw, for the comparison to expected work. In another embodiment, the Work to b Completed Counter, We, may have the accumulated credit added to it, We=We+Cw, for the comparison to work completed. The responsive action taken can also include the selection of a new task for execution by the scheduler module 120.

Figure 3:
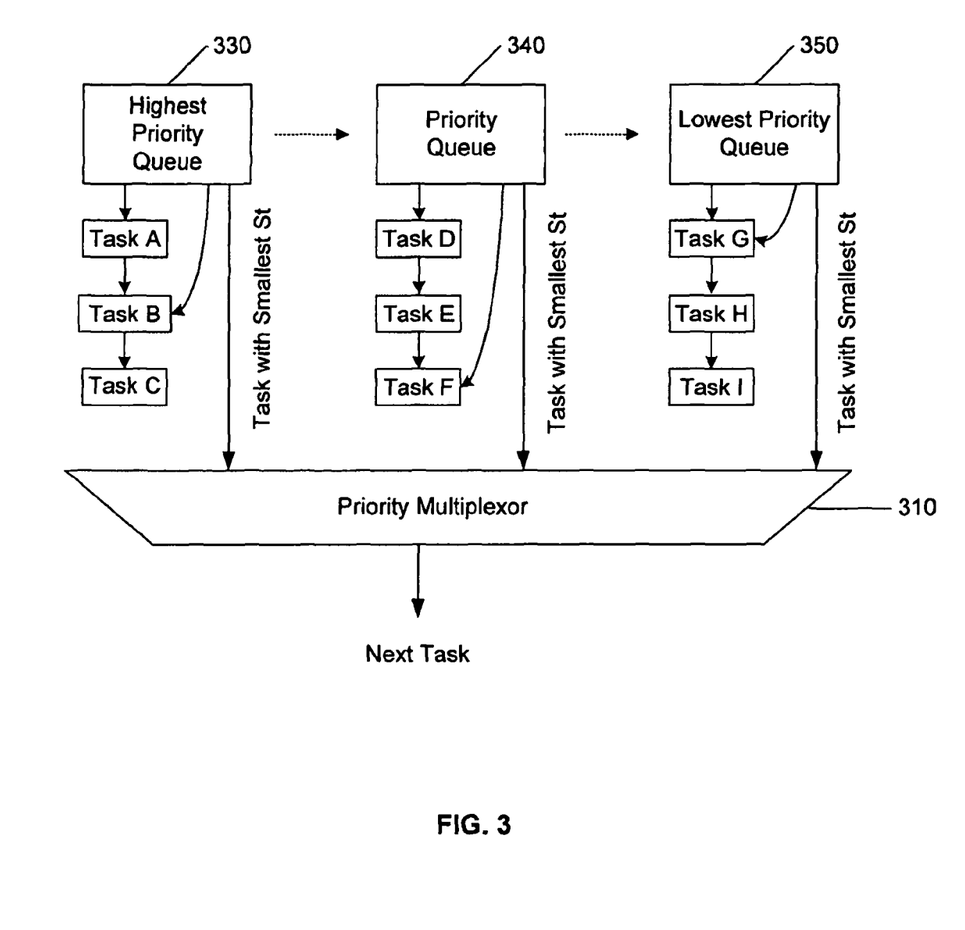
FIG. 3 illustrates one embodiment of an operation implemented in the scheduler module according to an embodiment.

FIG. 3 illustrates one embodiment of an operation implemented in the scheduler module 120 according to an embodiment. For explanatory purposes, FIG. 3 will be discussed with reference to FIG. 1. In general, one embodiment of the scheduler module 120 includes a priority multiplexor 310. The priority multiplexor 310 receives a task identification (e.g. a pointer to the task) that identifies a task to be executed by the processor system 10 of FIG. 1. The fetch/branch unit 115 receives interrupt and transfers control to a software, such as an interrupt handler, necessary to perform the task switch to the next selected task, for example. In one embodiment, the interrupt handler reads the selected task identification from the scheduler and then place that task in execution, and move the necessary task into to the metering module 110. In some embodiments scheduler module provides the interrupt to a hardware task switch, for example for handling the interrupt. In some embodiments, the interrupt handler is independent of the fetch/branch unit 115. The tasks can be received from the system memory 150, for example. The priority multiplexor 310 ranks the tasks received based on their task priority parameter acquired from the task profile associated with each task. The task profile can be stored in the system memory 150 or in a task context memory (not shown). In one embodiment, the task priority is predetermined during the process of mapping a task to a target computer system. The tasks can be grouped into different priority ranks ranging from the highest priority queue 330 to the lowest priority queue 350. The lowest ranked priority tasks are placed in the lowest priority queue 350 while the highest ranked priority tasks are placed in the highest priority queue 330. Tasks under the same priority queue, for example, the highest priority queue 330 may be further ranked or prioritized by the priority queue itself. The ranking may be based on the task with the smallest start time, for example. The start time of each task may be a task parameter in the task profile. The start time can be defined as the time a task should be scheduled for the execution. In one embodiment, the start time (St) is calculated each time the task is executed or each time the task completes execution (is moved from the meter). A task with an earlier (smaller) start time should be scheduled ahead of another task, of the same priority class, with a later (larger) start time. In some embodiments, there are two levels of searching, a intra-priority queue (search by start time, and then a inter-priority queue for the highest priority queue, for example, with a ready task. To select the next task(s) for execution, the priority multiplexor 310 searches the scheduling queue for the task(s) of the highest priority with the smallest start time. This task, for example Task B, is selected as the next task to run and may change as new tasks become ready (as they may have higher priority or (equal priority and) smaller start times than the currently selected next task to run). In one embodiment, the start time is continuously calculated and as such may be used on to compare against other start times to potentially preempt the current task. Whenever a task switch occurs, the currently selected task is selected as the new task. In some embodiments after all of the tasks from the highest priority queue have been selected, tasks from the lower priority queues are then selected as described above with respect to the highest priority queue 330.

Should a higher priority task than the currently executing task be selected as the next task to run, the scheduler module 120 may signal the processor system 10, depending on configuration, that a higher priority task is ready to run. The processor system 10 (or software on the processor) may decide to preemptively switch from the currently running task and run the higher priority task. In which case, the task currently running is placed in the scheduler module 120 as illustrated in FIG. 1 above, with the work so-far completed, Wc saved and new (higher priority) task selected for execution. When this preempted task is re-selected for execution, it will begin where it left off (and complete the remaining work to be done). The work to be done may be updated to include work credit accumulated during the time it was waiting. This preemptive task switching may be conditionally controlled (to allow some minimum work completed (Wc greater than or equal to Wmin minimum work threshold, or minimum elapsed time threshold) if so configured.

Figure 4:
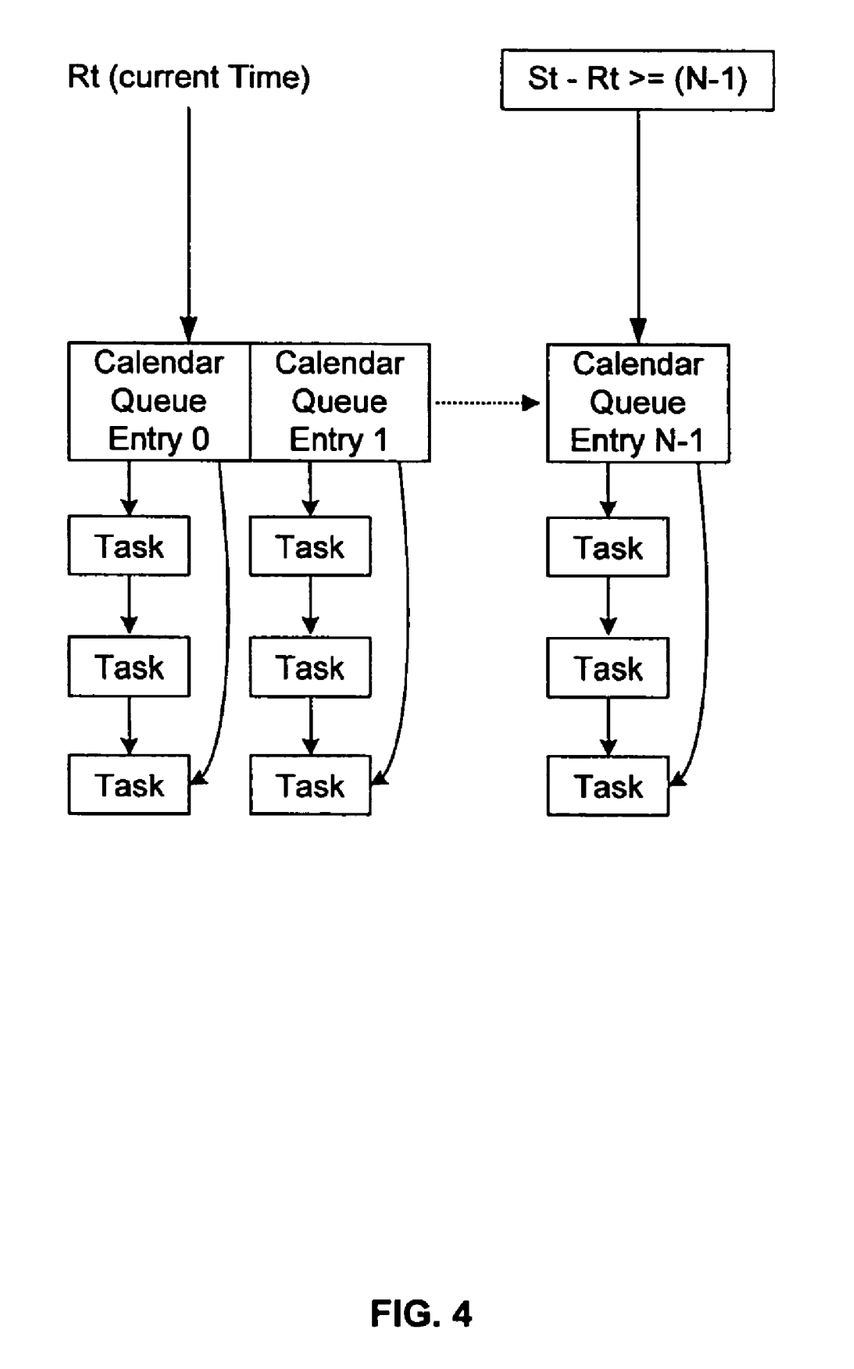
FIG. 4 illustrates one embodiment of the operation implemented in the shaper module according to an embodiment.

FIG. 4 illustrates one embodiment of an operation implemented in the shaper module 130 according to an embodiment. For explanatory purposes, FIG. 4 will be discussed with reference to FIG. 1. The shaper module 130 receives task parameters, for example, a start time for a particular task and real time. The real time is the current time, for example indicated by a computer system clock, and the calculated start time is the start time calculated for a particular task. The initial start time may be calculated by the management module 106 and included as a task parameter in the task profile. In one embodiment, the start time is calculated by the scheduler module 120 whenever a task becomes the non-current task (i.e. is moved from the metering module 110). In other embodiments, the start time can be calculated by the metering module 110. In one embodiment, the shaper module 130 and the scheduler module 120 are a single unit. The shaper module compares the calculated start time with the real time and delays task for scheduling based on the results of the comparison. In one embodiment, the shaper module 130 delays tasks for scheduling when the calculated start time is greater than (i.e. at a future time) the real time (i.e. when the calculated start time is at a future time in comparison to the real time). When a task(s) become unblocked, it may be ineligible (delayed in the shaper) until it becomes eligible in compliance with its task profile. In one embodiment, the task parameters of the task profile are used to calculate the start time. The task can be blocked in the scheduler or in the shaper.

In some embodiments, the shaper module 130 utilizes a calendar queue for example, Calendar Queue Entry 1. The calendar queue implementation of this embodiment is only one way of implementing a calendar queue. There are many other existing ways of implementing calendar queues. The shaper module 130 inserts an ineligible task into the location St−Rt (difference from the start time, St, to real time, Rt) units in the future, where the task will be eligible (for example the tasks under Calendar Queue Entry N−1). As the calendar queue is of finite size, the index is calculated as MAX(St−Rt, MAX_CALENDAR_SIZE−1) where MAX_CALENDAR_SIZE (N) is the number of discrete time entries of the calendar queue. When the current real time Rt advances to a non-empty calendar location, the shaper module 130 transfers each task at that location for which St=Rt to the scheduler module 120. This occurs when St=Rt at calendar queue entry 0 illustrated in FIG. 4 and the task with the smallest St can be selected first for execution. The index represents a time related value in the future from the current time or real time. A task with St>Rt is reinserted into the calendar queue within a certain threshold. The threshold and the size of the calendar depend on the system design, precision of the real time clock and the desired time granularity. The calendar queue is a circular queue such that as the real time advances, the previous current time entry becomes the last entry in the calendar queue. In the example of FIG. 4, when the real time advances to entry 1, entry 0 becomes the oldest queue entry. The index must take into account the fact that the calendar is a circular queue. The current time index advances from 0 to N−1 as real time advances. Thus at point N−1 the current time index wraps back to zero.

One shaper module 130 implementation continuously searches its calendar queue for a task with a start time less than the current real time. For any task whose St is less than or equal to the real time Rt, that task is placed in the scheduler module 120. A task can be delayed for execution when the start time is at a future time with respect to the current time. For example, tasks in calendar queue entry 1 up to calendar queue entry N−1 are delayed in the shaper module 120.

Should a task be delayed from execution for an period of time, it may accumulate credit for work to be completed. This credit (Cw) is accumulated at the rate Wr times the elapsed time; thus, Cw=Cw+(Wr*Elapsed Time). A maximum work to be completed (Wm) may be used if so configured to limit the work accumulated such that Cw is not greater than Wm. When a task is not executing it is accumulating credit. When task is executing the credit is updated based on work completed in excess of the expected work.

Figure 5:
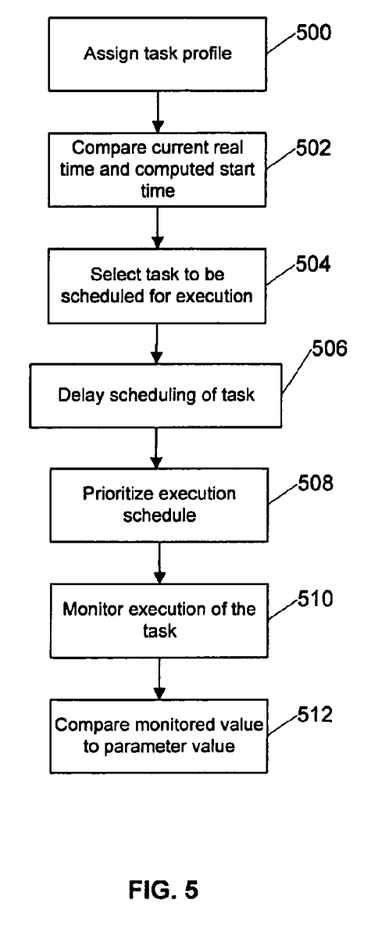
FIG. 5 is a flowchart of a method for managing the performance of tasks in a computer system according to an embodiment.

FIG. 5 is a flowchart of a method for managing the performance of tasks in a computer system according to an embodiment. In one embodiment, the method can be implemented in the processor system 10 of FIG. 1.

In block 500, a task profile is assigned to one or more tasks or a set of instructions representing the one or more tasks. The task profile specifies the task parameters for one or more tasks, where the one or more tasks are scheduled to be executed on the computer system. The work element can be, for example, work related to a subset of the set of instructions to be performed by the processor system 10 illustrated in FIG. 1 above. In one embodiment each time a new task is created, an initialization process may be completed where the task parameters (profile) for the task are determined. A management module 106 or entity (for example, a computer program) determines the individual task profile parameters in accordance with certain policies appropriate for the computer system's intended operation. The information for this new task is stored in the task context memory. These parameters can be statically determined. For example, the parameters of the task can be determined in terms of the amount of data that a task is expected to write to a certain buffer at specific interval, and this is something that may be predetermined during the process of mapping task to a target computer system. In some embodiments, the task parameters may be dynamically determined so that the parameters can be tailored to current conditions of the computer system, for example.

In block 502, the current real time is compared to a computed start time associated with a task of the one or more tasks to determine whether to schedule the execution of the task. The process then continues to block 504 where the task is selected to be scheduled for execution when the value of the difference between the current real time and the calculated start time meets a threshold criteria. In one embodiment, step 504 occurs in accordance with the task parameters including a parameter indicating that the task is not waiting on one of the occurrence and non-occurrence of an event. The steps of block 502 and 504 can be implemented in the scheduler module 120 and the shaper module 130 of FIG. 1. In one embodiment, a task may be blocked if it is awaiting an event (such as arrival of a message from another task, data from an external Input-Output device, etc.) before it can be scheduled for execution and is deemed unblocked if it is not waiting for such an event. This state may be controlled by software, such as an operating system. A task is eligible for execution if the current real time (value of a real time clock) is equal to or greater than the computed start time and ineligible if the start time is greater than real time. If the task is, both unblocked and eligible for execution, it is termed ready and may be selected for execution scheduling. A task can be blocked or unblocked in the scheduler module 120 or the shaper module 130.

In block 506, the scheduling of the execution of the task is delayed when the value of the difference between the current real time and the calculated start time fails to meet the threshold criteria. The steps of block 506 can be implemented in the shaper module 130 of FIG. 1. In block 508, the tasks are scheduled based on priority. The steps of block 508 can be implemented in the scheduler module 120 of FIG. 1. Prioritizing the execution schedule of the task is based on the task parameters including a task priority associated with the task profile. A task may be available for scheduling in block 508 when the task is unblocked and eligible. For example, when a task is placed in the scheduler module 120, it is placed in the appropriate priority queue according to priority, P, specified in the task's profile.

The process then continues to block 510 where the execution of the task is monitored determine a value related to the amount of work completed for the task. The steps of block 508 can be implemented in the metering module 110 of FIG. 1. The monitored value related to the amount of work completed may be indicated by a counter of the metering module 110. In one embodiment, the metering module 110 updates a work completed counter, Wc, with the monitored work value each time the monitored value changes (Wc(current)=Wc+Monitored_Value).

Finally in block 512, the value related to the amount of work completed is compared to a parameter value related to the amount of work to be completed of the task. A responsive action is taken when the difference between the monitored value related to the amount of work completed and the parameter value related to the amount of work to be completed meets a first threshold criteria. The amount of work to be completed determines the expected work to be performed by the task when it is scheduled for execution. In one embodiment, if Wc becomes greater than or equal to We, the expected work to be completed, the processor system 10 (or state machine) is signaled (with an interrupt for example) to switch to a new task. If the task remains in an unblocked state then a new start time, St, is calculated. There are several ways to calculate start time based on desired system behavior. One embodiment may calculate start time St=St (the last calculated start time)+Ti, while another embodiment may calculate start time St=MAX(St, Rt−Cw/Wr)+Wc/Wr where Rt is the current real time. Some embodiments may use multiple equations, configured for each task or class of tasks. If the task is eligible, that is the new St is less than or equal to the (current) real time, then the task is placed in the scheduler module 120 otherwise it is placed in the shaper module 130. When the task completes its expected work, Wc is set to zero in preparation of the next time the task is scheduled for execution.

An additional method for performance management is the use of buffer or cache occupancy quotas. These occupancy quotas are numerical limits of the number of buffers a task may (or should) use. This occupancy quota, Oq, and current occupancy Oc may be additional stored in the task profile. The management entity controls the occupancy Occupancy in this case is an indication of actual number of buffers being used by a particular task. A buffer is a memory or region of memory used to temporarily hold data (such as an input/output buffer cache) while it is being moved from one place to another or to allow faster access (such as an instruction/data cache).

As buffers (or cache blocks/lines) are allocated to a particular task, the occupancy counter Oc is incremented. Whenever the occupancy quota is greater than the Occupancy counter (Oc>Oq), the task is exceeding its occupancy quota.

Exceeding the occupancy quotas will cause that task's buffers to be replaced preferentially (cache block/line replacement) or prevent the allocation of new buffers until the entity is in compliance with its quota (Oc=<Oq).

The description provides mechanisms to control the allocation of processor (or state machine) execution resources to individual tasks executing in computer systems. The management module 106 controls the allocation of execution resources, to all tasks, each task may be provided with throughput and response time guarantees. This control is accomplished through workload shaping which delays the execution of tasks that have used their workload allocation until sufficient time has passed to accumulate credit for execution (accumulate credit over time to perform their allocated work) and workload prioritization which gives preference to tasks based on configured priorities.

It should be noted that many components that are included in the elements of FIGS. 1-5 have been omitted to make the descriptions more clear. One will note that these omitted elements such as processors, network ports, memories, buses, transceivers, etc., would be included in such elements in a manner that is commonly known to those skilled in the art.

Those of skill will appreciate that the various illustrative logical blocks, modules, circuits, and algorithm steps described in connection with the embodiments disclosed herein can often be implemented as electronic hardware, computer software, or combinations of both. To illustrate this interchangeability of hardware and software, various illustrative components, blocks, modules, circuits, and steps have been described above generally in terms of their functionality. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), a security beacon device, server, and sub-station specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of managing the performance of a processor system comprising:
   creating a list of processor tasks to be executed by one or more processors of the processor system with each task having an associated task profile that specifies task parameters including a calculated start time, wherein each task comprises a set of instructions to be executed by at least one processor of the processor system and wherein the calculated start time characterizes a time at which the corresponding task should be next scheduled to be executed by at least one of the processors;
   tracking credit for each of the tasks in the lists of tasks, wherein credit is accumulated at a rate equal to a corresponding product of work rate and elapsed time and credit for the task is reduced when the task is selected for execution by the corresponding work completed;
   comparing a current real time with the calculated start times associated with each of the tasks in the list of tasks;
   selecting at least one first task to be scheduled for execution from the list of tasks when a value of a difference between the current real time and the calculated start time for the at least one first task meets a first threshold criteria and in accordance with the task parameters including a parameter indicating the at least one first task is not dependent on one of an occurrence and non-occurrence of an event;
   monitoring the execution of the at least one first task to determine a monitored value related to an amount of work completed for the at least one first task;
   comparing the monitored value related to the amount of work completed to a value based on the tracked credit that is related to an amount of work to be completed by the at least one first task; and
   throttling the at least one first task from completing additional work when a difference between the monitored value related to the amount of work completed and the value related to the amount of work to be completed meets a second threshold criteria until a pre-defined amount of credit for performing work is accumulated.

2. The method of claim 1, further comprising:
   signaling the processor system that the at least one first task has completed its scheduled work and a next selected task should replace the at least one first task.

3. The method of claim 2, wherein signaling the processor system comprises sending an interrupt to an instruction fetch/branch unit of the processor system.

4. The method of claim 1, further comprising determining start time including a time between scheduled execution runs of the at least one first task.

5. The method of claim 4, wherein the at least one first task has a smallest calculated start time as compared to other tasks having a same task priority class.

6. The method of claim 1, further comprising controlling allocation of processing resources to the at least one first task by delaying the execution of one or more other tasks that have used their respective workload allocation until sufficient time has passed to accumulate credit for execution above a pre-defined threshold.

7. The method of claim 1, further comprising blocking the scheduling of execution of at least one second task when the at least one second task is waiting on the occurrence of an event.

8. The method of claim 1, wherein the event includes waiting for arrival of one of a message from another task and data from an external input-output device.

9. The method of claim 1, wherein the task profile comprises one or more of: task priority, work rate, scheduling interval, work to be completed and maximum work to be completed.

10. The method of claim 1, further comprising managing execution of resources by scheduling the tasks based on completing a certain amount of work periodically.

11. The method of claim 1, wherein the amount of work completed is a measure of one of data transference and processor instructions completed.

12. The method of claim 1, further comprising setting the task parameters of the one or more tasks by control software, the task parameters being predetermined during the process of mapping the corresponding task to a target computer system.

13. The method of claim 1, wherein the tasks are selected from a group consisting of: computer processes, instances of computer programs that are being executed, threads of execution including one or more simultaneously, pseudo-simultaneously, executing instances of a computer program closely sharing resources that execute within one or more processors, virtual machines including virtual execution environments on one or more processors, or state machine tasks.

14. The method of claim 1, further comprising allocating at least one buffer occupancy value to each task and storing the buffer occupancy value as a parameter of the associated task profile, the buffer occupancy value related to one of a buffer size value and number of buffers.

15. The method of claim 14, further comprising monitoring allocation of buffers on behalf of a task to determine a monitored buffer value related to one of a buffer size value and number of buffers.

16. The method of claim 15, further comprising comparing the monitored buffer value to a buffer occupancy value associated with a task and taking a responsive action when a difference between the monitored buffer value and the buffer occupancy value meets a second threshold criteria.

17. The method of claim 16, wherein the responsive action includes one of replacing the buffers of the task and preventing the allocation of new buffers.

18. The method of claim 1, wherein the processor system is a state machine, and the tasks are state machine tasks.

19. The method of claim 1, wherein the start time is calculated continuously or when the task is no longer being executed.

20. The method of claim 1, wherein the task list can be created dynamically, with tasks added and subtracted over time.

21. The method of claim 1, further comprising:
prioritizing an execution schedule for at least a portion of the tasks based on task parameters including a configured priority.

22. The method of claim 1, further comprising:
limiting an amount of credit associated with a task by a maximum work to be completed parameter.

23. A processor system of managing the performance of a computer system comprising:
one or more processors
memory storing instructions for execution by the one or more data processors, the instructions implementing:
a shaper module configured to track credit for each tasks of a plurality of tasks, wherein credit is accumulated at a rate equal to a corresponding product of work rate and elapsed time and credit for the task is reduced when the task is selected for execution by the corresponding work completed, wherein the shaper module is further configured to compare a current real time and a computed start time associated with each task to determine whether to select a task to be scheduled for execution, wherein tasks are scheduled for execution when a value of a difference between a current real time and a calculated start time meets a first threshold criteria and in accordance with task parameters including a parameter indicating the corresponding task is not dependent on one of an occurrence and non-occurrence of an event, wherein each task comprises a set of instructions to be executed by at least one of the one or more processors of the processor system and wherein the calculated start time characterizes a time at which the corresponding task should be next scheduled to be executed by at least one of the one or more processors;
a scheduler module configured to prioritize an execution schedule of the plurality of tasks based on the task parameters including a configured priority after the tasks have been selected to be scheduled by the shaper module; and
a metering module configured to monitor the execution of tasks being executed by the computer system to determine a monitored value related to an amount of work completed by the task and to compare the monitored value related to an amount of work completed to a value based on the tracked credit that is related to the amount of work to be completed by the task so that a responsive action can be taken, wherein the responsive action comprises selectively allocating or de-allocating processing resources provided by the one or more processors for the corresponding task, wherein the selectively allocated or de-allocating processing resources comprises: throttling a task from completing additional work when a difference between the corresponding monitored value related to the amount of work completed and the corresponding value related to the amount of work to be completed meets a second threshold criteria until a pre-defined amount of credit for performing work is accumulated.

24. The system of claim 23, further comprising an instruction cache configured to store instructions received from a system memory.

25. The system of claim 24, further comprising an instruction fetch/branch unit configured to receive instructions from the instruction cache and to receive an interrupt signal to cause the processor system to move to execute a different task selected by the scheduler.

26. The system of claim 25, wherein the metering module is further configured to receive the monitored value from the instruction fetch/branch unit, the monitored value measured in instructions completed by the instruction fetch/branch unit.

27. The system of claim 23 further comprising a data cache configured to store data items that have been recently accessed from a system memory.

28. The system of claim 27, further comprising a load/store unit configured to access the data cache to perform load and store operations and to generate the monitored value to be received by the metering module, the monitored value measured in memory operations.

29. The system of claim 23, wherein the metering module when used to monitor memory operations is configured to account for memory operations to/from certain addresses.

30. An apparatus for managing the performance of a processor system comprising:
one or more processors;
memory storing instructions, which when executed by the one or more processors result in operations comprising:
creating a list of processor tasks to be executed by one of the one or more processors of the processor system with each task having an associated task profile that specifies task parameters including a calculated start time, wherein each task comprises a set of instructions to be executed by at least one of the one or more processors of the processor system and wherein the calculated start time characterizes a time at which the corresponding task should be next scheduled to be executed by at least one of the processors;
tracking credit for each of the tasks in the list of tasks, wherein credit is accumulated at a rate equal to a corresponding product of work rate and elapsed time, and credit for the task is reduced when the task is selected for execution by the corresponding work completed;
comparing a current real time with the calculated start times associated with each of the tasks in the list of tasks;
selecting at least one first task to be scheduled for execution from the list of tasks when a value of a difference between the current real time and the calculated start of a task time for the at least one first task meets a first threshold criteria and in accordance with the task parameters including a parameter indicating the at least one first task is not dependent on one of an occurrence and non-occurrence of an event;
for prioritizing an execution schedule for the tasks based on the task parameters including a configured priority;
monitoring the execution of the at least one first task to determine a monitored value related to an amount of work completed for the at least one first task;
comparing the monitored value related to the amount of work completed to a value based on the tracked credit that is related to an amount of work to be completed by the at least one first task; and
throttling the at least one first task from completing additional work when a difference between the monitored value related to the amount of work completed and the value related to the amount of work to be completed meets a second threshold criteria until a pre-defined amount of credit for performing work is accumulated.

31. The apparatus for managing the performance of a processor system of claim 30, wherein the operations further comprise determining scheduling interval including a time between scheduled execution run of the at least one first task.

32. The apparatus for managing the performance of a processor system of claim 30, wherein the operations further comprise controlling allocation of processing resources to the at least one tasks by delaying the execution of one or more other tasks that have used their workload allocation until sufficient time has passed to accumulate credit for execution.

33. The apparatus for managing the performance of a processor system of claim 30, wherein the operations further comprise blocking the scheduling of execution of at least one second task when the at least one second task is waiting on the occurrence of an event.

34. A method comprising:
scheduling a plurality of processor tasks for execution by one or more processors of a processors system, wherein each task comprises a set of instructions to be executed by at least one processor of the processor system and wherein each task has an associated task profile that specifies task parameters including a calculated start time that characterizes a time at which the corresponding task should be next scheduled to be executed by at least one of the processors, the scheduling:
tracking credit for each of the tasks in the list of tasks, wherein credit is accumulated at a rate equal to a corresponding product of work rate and elapsed time, and credit for the task is reduced when the task is selected for execution by the corresponding work completed;
comparing a current real time with the calculated start times associated with each of the tasks in the list of tasks;
selecting at least one first task to be scheduled for execution from the list of tasks when a value of a difference between the current real time and the calculated start time for the at least one first task meets a first threshold criteria and in accordance with the task parameters including a parameter indicating the at least one first task is not dependent on one of an occurrence and non-occurrence of an event;
monitoring execution of the plurality of tasks to determine, for each executing task, a monitored value related to an amount of work completed for the task, wherein the amount of work to be completed is a task parameter that determines expected work to be performed by the corresponding task when it is scheduled for execution; and
selectively allocating, or de-allocating processing resources provided by the one or more processors for each task based on a comparison of the monitored value related to the amount of work completed to a value based on the tracked credit that is related to an amount of work to be completed by the corresponding task, wherein the selectively allocating, or de-allocation processors resources comprises: throttling the at least one first task from completing additional work when a difference between the monitored value related to the amount of work completed and the value related to the amount of work to be completed meets a second threshold criteria until a pre-defined amount of credit for performing work is accumulated.

35. A computer program product comprising a non-transitory computer storage medium storing instructions, which when executed by at least one or more processors of a processor system, result in operations comprising:
creating a list of processor tasks to be executed by the one or more processors of the processor system with each task having an associated task profile that specifies task parameters including a calculated start time, wherein each task comprises a set of instructions to be executed by at least one processor of the processor system and wherein the calculated start time characterizes a time at which the corresponding task should be next scheduled to be executed by at least one of the processors;
tracking credit for each of the tasks in the lists of tasks, wherein credit is accumulated at a rate equal to a corresponding product of work rate and elapsed time and credit for the task is reduced when the task is selected for execution by the corresponding work completed;
comparing a current real time with the calculated start times associated with each of the tasks in the list of tasks;
selecting at least one first task to be scheduled for execution from the list of tasks when a value of a difference between the current real time and the calculated start time for the at least one first task meets a first threshold criteria and in accordance with the task parameters including a parameter indicating the at least one first task is not dependent on one of an occurrence and non-occurrence of an event;
monitoring the execution of the at least one first task to determine a monitored value related to an amount of work completed for the at least one first task;
comparing the monitored value related to the amount of work completed to a value based on the tracked credit that is related to an amount of work to be completed by the at least one first task; and
throttling the at least one first task from completing additional work when a difference between the monitored value related to the amount of work completed and the value related to the amount of work to be completed meets a second threshold criteria until a pre-defined amount of credit for performing work is accumulated.

36. The computer program product of claim 35, wherein the operations further comprise:
signaling the processor system that the at least one first task has completed its scheduled work and a next selected task should replace the at least one first task.

37. The computer program product of claim 36, wherein signaling the processor system comprises sending an interrupt to an instruction fetch/branch unit of the processor system.

38. The computer program product of claim 35, wherein the operations further comprise:
determining start time including a time between scheduled execution runs of the at least one first task.

39. The computer program product of claim 38, wherein the at least one first task has a smallest calculated start time as compared to other tasks having a same task priority class.

40. The computer program product of claim 35, wherein the operations further comprise:
controlling allocation of processing resources to the at least one first task by delaying the execution of one or more other tasks that have used their respective workload allocation until sufficient time has passed to accumulate credit for execution above a pre-defined threshold.

41. The computer program product of claim 35, wherein the operations further comprise:
blocking the scheduling of execution of at least one second task when the at least one second task is waiting on the occurrence of an event.

42. The computer program product of claim 35, wherein the event includes waiting for arrival of one of a message from another task and data from an external input-output device.

43. The computer program product of claim 35, wherein the task profile comprises one or more of: task priority, work rate, scheduling interval, work to be completed and maximum work to be completed.

44. The computer program product of claim 35, wherein the operations further comprise:
managing execution of resources by scheduling the tasks based on completing a certain amount of work periodically.

45. The computer program product of claim 35, wherein the amount of work completed is a measure of one of data transference and processor instructions completed.

46. The computer program product of claim 35, wherein the operations further comprise:
   setting the task parameters of the one or more tasks by control software, the task parameters being pre-determined during the process of mapping the corresponding task to a target computer system.

47. The computer program product of claim 35, wherein the tasks are selected from a group consisting of: computer processes, instances of computer programs that are being executed, threads of execution including one or more simultaneously, pseudo-simultaneously, executing instances of a computer program closely sharing resources that execute within one or more processors, virtual machines including virtual execution environments on one or more processors, or state machine tasks.

48. The computer program product of claim 35, wherein the operations further comprise:
   allocating at least one buffer occupancy value to each task and storing the buffer occupancy value as a parameter of the associated task profile, the buffer occupancy value related to one of a buffer size value and number of buffers.

49. The computer program product of claim 48, wherein the operations further comprise:
   monitoring allocation of buffers on behalf of a task to determine a monitored buffer value related to one of a buffer size value and number of buffers.

50. The computer program product of claim 49, wherein the operations further comprise:
   comparing the monitored buffer value to a buffer occupancy value associated with a task and taking a responsive action when a difference between the monitored buffer value and the buffer occupancy value meets a second threshold criteria.

51. The computer program product of claim 50, wherein the responsive action includes one of replacing the buffers of the task and preventing the allocation of new buffers.

52. The computer program product of claim 35, wherein the processor system is a state machine, and the tasks are state machine tasks.

53. The computer program product of claim 35, wherein the start time is calculated continuously or when the task is no longer being executed.

54. The computer program product of claim 35, wherein the task list can be created dynamically, with tasks added and subtracted over time.

55. The computer program product of claim 35, wherein the operations further comprise:
   prioritizing an execution schedule for at least a portion of the tasks based on task parameters including a configured priority.

56. The computer program product of claim 35, wherein the operations further comprise:
   limiting an amount of credit associated with a task by a maximum work to be completed parameter.

* * * * *